United States Patent [19]

Miura et al.

[11] Patent Number: 4,806,138
[45] Date of Patent: Feb. 21, 1989

[54] METHOD FOR MELTING FLUOROPHOSPHATE GLASS

[75] Inventors: Kiyotaka Miura, Akishima; Tetsuro Izumitani, Hino; Toshiharu Yamashita, Hachioji, all of Japan

[73] Assignee: Hoya Corporation, Tokyo, Japan

[21] Appl. No.: 146,679

[22] Filed: Jan. 21, 1988

[30] Foreign Application Priority Data

Jan. 24, 1987 [JP]   Japan ................................. 62-14953

[51] Int. Cl.$^4$ ............................................... C03B 5/42
[52] U.S. Cl. .................................. 65/32.1; 65/135; 65/374.15
[58] Field of Search ................. 65/26, 32, 134, 135, 65/374.15; 501/44

[56] References Cited

U.S. PATENT DOCUMENTS

| | | | |
|---|---|---|---|
| 296,227 | 4/1884 | Schulze--Berge | 65/374.15 |
| 2,038,627 | 4/1936 | Bodger | 65/32 |
| 3,281,254 | 10/1966 | Weidel | 501/44 |
| 3,457,056 | 7/1969 | Greenler | 65/374.15 |
| 3,998,615 | 12/1976 | Gortz et al. | 65/32 |
| 4,120,814 | 10/1978 | Izumitani et al. | 501/44 |
| 4,239,645 | 12/1980 | Izumitani et al. | 501/44 |
| 4,308,543 | 11/1982 | Nozawa | 501/44 |
| 4,405,724 | 9/1983 | Tick | 65/32 |
| 4,612,023 | 9/1986 | Kretzer et al. | 65/32 |
| 4,771,020 | 9/1988 | Onata et al. | 501/44 |

Primary Examiner—Peter Kratz
Attorney, Agent, or Firm—Nixon & Vanderhye

[57] ABSTRACT

A high quality fluorophosphate laser glass free from bubbles, inclusions and coloring can be obtained by melting a fluorophosphate glass having a total oxide content of 5 to 30% in terms of cationic %, in a carbon container under a non-oxygen gas atmosphere.

8 Claims, 1 Drawing Sheet

METHOD FOR MELTING FLUOROPHOSPHATE GLASS

BACKGROUND OF THE INVENTION

1. Field of the Invention

The present invention relates to a method for melting a fluorophosphate glass. The fluorophosphate glass obtained according to the method of the present invention can be used for a laser amplifier for laser nuclear fusion, a laser window, an optical lens, etc.

2. Description of Prior Art

Phosphate glasses and fluorophosphate glasses used as a laser glass are produced by melting in a platinum container. In this production, however, contamination of said glass by platinum inclusions caused by dissolution of container platinum into the glass has been inevitable. Platinum inclusions cause the thermal destruction of said glass by the laser beam and, accordingly, the acceptable upper limit of the platinum inclusions is becoming severer (lower) with the recent increase of laser output, that is, the limit is now controlled below a microscopically detectable level. Hence, the decrease or elimination of platinum inclusions in the melting of a phosphate glass or fluoprophosphate glass in a platinum container is an important task in production of laser glass.

It was attempted to melt said glass in a clay crucible or a silica or alumina crucible in place of a platinum container. In this attempt, however, the crucible materials were chemically attacked and a glass has not been obtained yet which has a high quality required for laser glasses and which is free from impurities and coloring.

Use of an amorphous carbon crucible was tried for melting a zirconium fluoride glass (the resulting glass is expected to be utilized as a material for low less optical communication fiber, and a relatively good quality glass was obtained on laboratory scale [Materials Science Forum, Vol. 5, pages 1 to 18 (1985), H. G. Drexhage]. However, the literature makes no mention of any oxide glass and oxide-containing glass.

Heretofore, it has generally been thought that a high quality glass can not be obtained by melting an oxide glass or oxide-containing glass in a carbon container, because the container carbon is oxidized to generate bubbles in the glass and further the oxide of the glass is reduced by the carbon.

No case has been reported yet in which any fluorophosphate glass was melted in a carbon container.

Hence, the object of the present invention is to provide a method for melting a fluorophosphate glass, which is particularly useful for obtaining a high quality fluorophosphate laser glass free from platinum inclusions or coloring.

SUMMARY OF THE INVENTION

The present inventors made research in order to achieve the above object and completed the present invention.

According to the present invention, there is provided a method for melting a fluorophosphate glass, which comprises melting a fluorophosphate glass having a total oxide content of 5 to 30% in terms of cationic %, in a non-oxygen gas atmosphere using a carbon container.

"Cationic %" mentioned above is a proportion expressed in percentage, of the number of each cation to the total number of all cations in the glass and can be calculated using the following formula.

$$\text{Cationic \%} = (\text{number of each cation}) \div (\text{total number of all cations}) \times 100$$

DETAILED DESCRIPTION OF THE INVENTION

Figure 1:
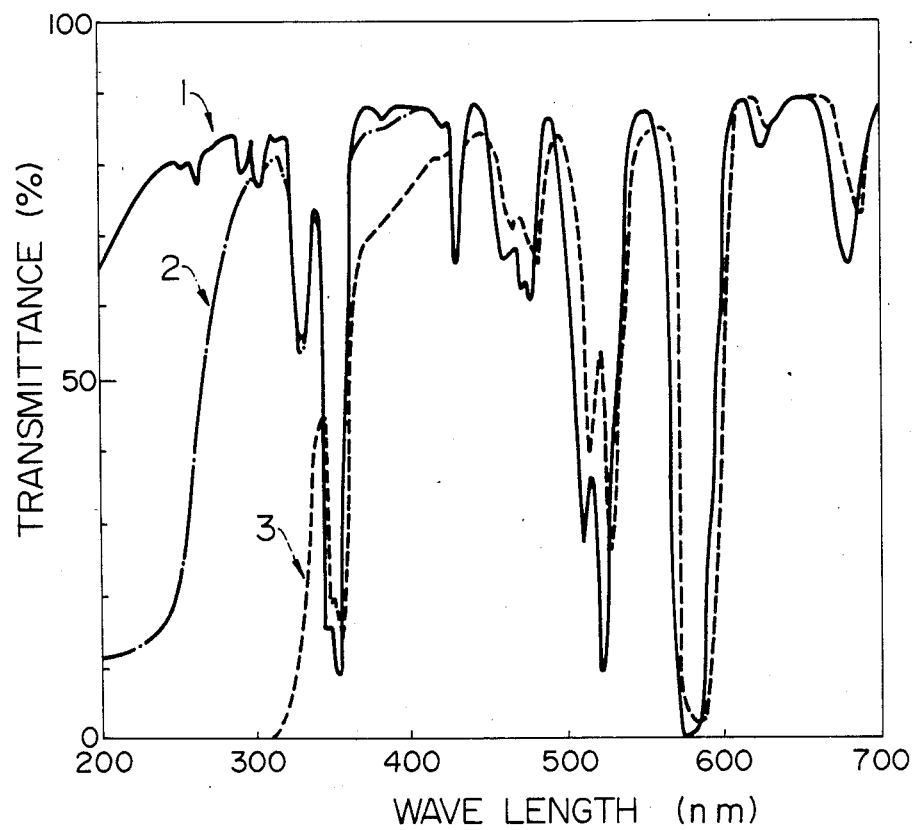
FIG. 1 is a graph showing a light transmittance curve of a fluorophosphate glass obtained in Example 1 according to the present invention and a light transmittance curve of a fluorophosphate glass obtained according to the conventional technique.

As the material of the carbon container used in the method of the present invention for melting a fluorophosphate glass, there can be mentioned ordinary graphite, high density graphite, amorphous carbon, etc., among which amorphous carbon is particularly preferable. This amorphous carbon which is also called "glassy carbon" is a black glassy carbon material. It has characteristics not possessed by ordinary carbon materials, such as low porosity (1 to 5%), high heat resistance (about 3,000° C.), high hardness (70 to 80 Shore) and high bending strength (500 to 1,200 kgf/cm$^2$).

Table 1 gives test data on the oxidation and exhaustion resistances of various carbon materials, excerpted from a pamphlet (issued in Mar., 1985) on glassy carbon (amorphous carbon), of TOKAI CARBON CO., LTD. It is appreciated from Table 1 that the glassy carbon (amorphous carbon) is superior in oxidation resistance and endurance to the ordinary graphite and even to the high density graphite.

TABLE 1

Test for oxidation and exhaustion resistance using a mixed gas ($N_2:O_2$ = 81:19) of 800° C. (flow rate: 0.5 liter/min, specimen dimension: 15 × 15 × 1 mm)

| Type of carbon material | Time (min) required to reach an exhaustion percentage of | | | |
|---|---|---|---|---|
| | 70% | 80% | 90% | 100% |
| Ordinary graphite | 68 | 95 | 110 | 140 |
| High density graphite | 160 | 185 | 225 | 275 |
| Glassy carbon (amorphous carbon) | 205 | 255 | 270 | 367 |

The carbon container refers to a totally carbon-made container or a container obtained by clothing or covering a container main body with carbon, and comprises all the portions including a stirring rod, a connecting pipe and a discharge pipe.

As the non-oxygen gas atmosphere used in the method of the present invention, an inert gas atmosphere such as nitrogen gas, argon gas or the like is most suitable in order to prevent the oxidation and exhaustion of the carbon container and the vaporization of the glass. For the purpose of dehydration and fluorine supplementation it is also preferable to use an atmosphere of a mixed gas comprising the above inert gas and a halogen compound gas (e.g. $CF_4$, $PF_5$, $SF_6$, $BF_3$, $NF_3$, $CCl_4$, $PCl_3$).

The non-oxygen gas atmosphere can be produced by flashing the above mentioned gas onto the upper portion of the container inside (the lower portion is packed with the fluorophosphate glass), or by blowing the gas into the fluorophosphate glass to cause bubbling.

The proportion of the halogen compound gas in the mixed gas is preferred to be not more than 30% by volume because too large a proportion may incur the exhaustion of the container carbon.

The oxide content in the glass is 5 to 30% in terms of cationic %. The reason is as follows. When the oxide content is more than 30% in terms of cationic %, the glass and the container carbon tend to react with each other and the resulting glass shows an increased nonlinear refractive index. When the oxide content is less than 5% in terms of cationic %, vitrification is difficult. The oxide content is preferred to be 10 to 20% for practical applications.

As the fluorophosphate glass, there can be mentioned, for example, those described in Japanese patent publication No. 14379/1983, such as a glass wherein 0.01 to 3% in terms of cationic %, of $\frac{1}{2}$ $Nd_2O_3$ is incorporated, as a component for laser oscillation, into a glass consisting of, in terms of cationic %, 5 to 25% of $\frac{1}{2}$ $P_2O_5$ and the rest of metal oxides, and a glass wherein the part or whole of the $\frac{1}{2}$ $Nd_2O_3$ in the above glass is substituted with $\frac{1}{2}$ $Er_2O_3$ and/or $\frac{1}{2}$ $Eu_2O_3$.

In the method for melting a fluorophosphate glass according to the present invention, the resulting glass is free from contamination by platinum inclusions and coloring by platinum ion because the method uses a carbon container; there occurs little reaction between the container carbon and the glass because a glass of low total oxide content is melted in a non-oxygen gas atmosphere using a carbon container; moreover, the exhaustion of the container carbon due to its reaction with oxygen in the air as well as the evaporation of the glass are reduced greatly.

The present invention is described in further detail below by way of Examples. However, the present invention is in no way restricted to these Examples.

EXAMPLE 1

In an amorphous carbon crucible having a cylindrical shape (50 mm in inside diameter, 56 mm in outside diameter, 3 mm in thickness and 85 mm in height) was placed 100 g of a raw material batch consisting of, in terms of % by weight, 25.4% of $AlF_3$, 5.7% of $YF_3$, 2.6% of $MgF_2$, 18.0% of $CaF_2$, 19.7% of $SrF_2$, 12.9% of $BaF_2$, 13.4% of $P_2O_5$ and 2.3% of $Nd_2O_3$ and, in terms of cationic %, 29% of $AlF_3$, 3.7% of $YF_3$, 4% of $MgF_2$, 22% of $CaF_2$, 15% of $SrF_2$, 7% of $BaF_2$, 18% of $\frac{1}{2}$ $P_2O_5$ and 1.3% of $\frac{1}{2}$ $Nd_2O_3$ (the total oxide content was 19.3% in terms of cationic %). Then, an amorphous carbon lid was placed on the crucible, after which the crucible with the lid was placed in a tubular furnace having a platinum heater and the raw material batch was melted for 2 hours at 900° C. while passing through the furnace argon gas containing 1.6% by volume of $NF_3$ at a flow rate of 3 liters/min. Subsequently, the crucible was taken out of the furnace and cooled naturally to 460° C. and slowly from 460° C. to room temperature (25° C.) to obtain a glass. A He-Ne gas laser beam having an output of 5 mW was applied to the glass to examine the presence of bubbles and inclusions in the glass using a microscope. Neither bubbles nor inclusions were detected.

Next, a YAG laser 20 Hz pulsed light having an energy density of 8 joules/cm² was applied at a laser beam diameter of 2 mm to the above glass while scanning the glass, to examine the laser damage of the glass. The glass obtained in this Example showed no damage while the conventional glass obtained by melting in a platinum container had many laser damages.

The glass of this Example, as illustrated in the light transmittance curve 1 of FIG. 1, shows no absorption by platinum ion and other impurities (iron ion, etc.) and accordingly has a higher transmittance in an ultraviolet-visible light range than the phosphate laser glass (the curve 3) described in Japanese patent application Kokai (Laid-Open) No. 120544/1979 and even the fluorophosphate glass (the curve 2) obtained by melting in a conventional platinum container (These light transmittances were all measured using a glass thickness of 10 mm). Therefore, the absorption of excited light by ions other than Nd ion is lowest in the glass of Example 1 and a high excitation efficiency can be obtained in the case of the glass. In general, the presence of water in a glass shortens the fluorescent life time of the glass in proportion to the content of the water and deteriorates the laser characteristics of the glass. The glass of Example 1, being sufficiently dehydrated, had a fluorescent life time of 400 μsec which was longer than that (380 μsec) of the glass of the same composition obtained by melting in a platinum container.

The raw material batch of this Example had an oxide content of as high as 19.3 cationic % (15.7% by weight). However, the crucible showed no change in gloss and surface state even after melting the material having such a high oxide content.

In this Example, since the melting of the fluorophosphate glass was conducted in an inert gas atmosphere using an amorphous carbon container, there was neither generation of bubbles by reaction of the glass and the container carbon, nor coloring of the glass.

EXAMPLE 2

In a high density graphite crucible having a cylindrical shape (60 mm in inside diameter, 80 mm in height and 5 mm in thickness) was placed 300 g of a raw material batch consisting of, in terms of % by weight, 29.6% of $AlF_3$, 5.6% of $YF_3$, 2.6% of $MgF_2$, 17.9% of $CaF_2$, 19.6% of $SrF_2$, 12.8% of $BaF_2$, 9.6% of $P_2O_5$ and 2.3% of $Nd_2O_3$ and, in terms of cationic %, 34% of $AlF_3$, 3.7% of $YF_3$, 4% of $MgF_2$, 22% of $CaF_2$, 15% of $SrF_2$, 7% of $BaF_2$, 13% of $\frac{1}{2}$ $P_2O_5$ and 1.3% of $\frac{1}{2}$ $Nd_2O_3$ (the total oxide content was 14.3% in terms of cationic %). The crucible was then placed in a high-frequency induction furnace provided in a glove box filled with a dry nitrogen gas atmosphere, and the raw material batch was melted for 2 hours at 900° C. The molten material batch was casted into a carbon mold and cooled slowly to obtain a glass. This glass, similarly to the glass obtained in Example 1, was free from bubbles and inclusions, showed no absorption by impurities, and underwent no damage even by a high energy laser beam. Further, the crucible showed no change after used for melting.

EXAMPLE 3

One kg of a material batch having the same composition as that of Example 1 was melted at 800° C. in an argon atmosphere in an ordinary graphite crucible to obtain a glass. The molten glass was transferred into an amorphous carbon crucible of 900° C. in an argon atmosphere through an ordinary graphite pipe. While stirring the glass with a stirring rod of amorphous carbon, a nitrogen gas containing 10% by volume of $PCl_3$ was blown into the glass for 15 minutes through an amorphous carbon pipe, after which the glass was allowed to stand for 30 minutes. Then, the glass was cooled to 650° C. and stirred for homogenization. Subsequently, the glass was poured into a mold through an amorphous carbon discharge pipe at the bottom of the crucible, whereby a glass of about 10×10×2 cm was obtained. This glass was not only free from bubbles, inclusions and absorption by impurities but also had no stria, and further showed no damage by high energy laser beam. Thus, the glass was a very high quality glass.

EXAMPLE 4

One hundred grams (100 g) of a raw material batch consisting of, in terms of % by weight, 21.1% of $P_2O_5$, 19.7% of $AlF_3$, 5.8% of $MgF_2$, 12.4% of $CaF_2$, 20.0% of $SrF_2$, 18.7% of $BaF_2$ and 2.3% of $Nd_2O_3$ and, in terms of cationic %, 28% of $\frac{1}{2}P_2O_5$, 22% of $AlF_3$, 8.7% of $MgF_2$, 15% of $CaF_2$, 15% of $SrF_2$, 10% of $BaF_2$ and 1.3% of $\frac{1}{2}Nd_2O_3$ (the total oxide content was 29.3% in terms of cationic %) was melted in the same atmosphere as in Example 1, using the same amorphous carbon container as in Example 1, to obtain a fluorophosphate glass free from bubbles, inclusions and coloring and having good characteristics.

EXAMPLE 5

One hundred grams (100 g) of a material batch consisting of, in terms of % by weight, 5.1% of $P_2O_5$, 30.9% of $AlF_3$, 8.5% of $YF_3$, 3.8% of $MgF_2$, 17.6% of $CaF_2$, 19.3% of $SrF_2$, 12.6% of $BaF_2$ and 2.2% of $Nd_2O_3$ and, in terms of cationic %, 7% of $\frac{1}{2}P_2O_5$, 36% of $AlF_3$, 5.7% of $YF_3$, 6% of $MgF_2$, 22% of $CaF_2$, 15% of $SrF_2$, 7% of $BaF_2$ and 1.3% of $\frac{1}{2}Nd_2O_3$ (the total oxide content was 8.3% in terms of cationic %) was melted in the same atmosphere as in Example 1, using the same amorphous carbon container as in Example 1, to obtain a fluorophosphate glass free from bubbles, inclusions and coloring and having good characteristics.

COMPARATIVE EXAMPLE

A phosphate laser glass composed only of oxides and consisting of, in terms of % by weight, 67.2% of $P_2O_5$, 5.2% of $Al_2O_3$, 16.8% of BaO, 8.3% of $K_2O$ and 2.5% of $Nd_2O_3$ and, in terms of cationic %, 70.2% of $\frac{1}{2}P_2O_5$, 7.6% of $\frac{1}{2}Al_2O_3$, 8.1% of BaO, 13.0% of $\frac{1}{2}K_2O$ and 1.1% of $\frac{1}{2}Nd_2O_3$ was melted in the same manners as in Example 1 and Example 2. The glass turned from an opaque gray color to a black color. Careful observation revealed that the resulting glass contained small bubbles and carbon inclusions. Further, the container deteriorated severely after used for melting.

According to the method of the present invention for melting a fluorophosphate glass, there can be produced a glass free from platinum inclusions and coloring by platinum, because a fluorophosphate glass having a total oxide content of 5 to 30% in terms of cationic % is melted using an amorphous carbon container in place of a conventional platinum container. Further, because the carbon container is used in a non-oxygen gas atmosphere, there occurs little reaction between the container carbon and the glass and there can be obtained a glass which is free from bubbles or striae and accordingly homogeneous and moreover low in light absorption by impurities.

Thus, the present invention has made it possible to produce a high quality fluorophosphate laser glass capable of withstanding even high output laser oscillation.

What is claimed is:

1. A method for melting a fluorophosphate glass, which comprises melting a fluorophosphate glass having a total oxide content of 5 to 30% in terms of cationic %, in a carbon container under a non-oxygen gas atmosphere.

2. A method according to claim 1, wherein the carbon container is made of the metal selected from the group consisting of an ordinary graphite, high density graphite and amorphous carbon.

3. A method according to claim 1, wherein the total oxide content in the fluorophosphate glass is 10 to 20%.

4. A method according to claim 1, wherein the non-oxygen gas atmosphere is an inert gas atmosphere or an atmosphere of a mixed gas consisting of an inert gas and a halogen compound gas.

5. A method according to claim 4, wherein the inert gas is at least one gas selected from nitrogen gas or argon gas.

6. A method according to claim 4, wherein the halogen compound gas is at least one gas selected from the group consisting of $CF_4$, $PF_5$, $SF_6$, $BF_3$, $NF_3$, $CCl_4$ and $PCl_3$.

7. A method according to claim 4, wherein the proportion of the halogen compound gas in the mixed gas consisting of an inert gas and a halogen compound gas is 30% by volume or below.

8. A method according to claim 1, wherein the fluorophosphate glass is a glass wherein 0.01 to 3% in terms of cationic %, of $\frac{1}{2}Nd_2O_3$ is incorporated, as a component for laser oscillation, into a glass consisting of, in terms of cationic %, 5 to 25% of $\frac{1}{2}P_2O_5$ and the rest of metal fluorides, or a glass wherein the part or whole of the $\frac{1}{2}Nd_2O_3$ in the above glass is substituted with $\frac{1}{2}Er_2O_3$ and/or $\frac{1}{2}Eu_2O_3$.

* * * * *